United States Patent [19]

Smith

[11] Patent Number: 5,764,391

[45] Date of Patent: Jun. 9, 1998

[54] ROTATING KNOB, VARIABLE IMAGE HOLOGRAPHIC DISPLAY

[75] Inventor: Ronald T. Smith, Corona Del Mar, Calif.

[73] Assignee: Raytheon Company, Lexington, Mass.

[21] Appl. No.: 768,486

[22] Filed: Dec. 18, 1996

[51] Int. Cl.⁶ .............................. G03H 1/00; G08B 5/00; G01D 11/28

[52] U.S. Cl. .............................. 359/34; 359/15; 359/18; 359/25; 340/815.56; 340/815.86; 362/23; 362/26; 362/27

[58] Field of Search .................. 359/1, 15, 18, 359/22, 25, 34; 340/815.53, 815.54, 815.55, 815.56, 815.57, 815.68, 815.86; 362/23, 26, 27, 31

[56] References Cited

U.S. PATENT DOCUMENTS

| | | | |
|---|---|---|---|
| 4,368,946 | 1/1983 | Kaneko et al. | 359/34 |
| 4,848,863 | 7/1989 | Kramer | 359/18 |
| 5,353,735 | 10/1994 | Arai et al. | 362/23 |

*Primary Examiner*—Paul M. Dzierzynski
*Assistant Examiner*—Darren E. Schuberg
*Attorney, Agent, or Firm*—Leonard A. Alkov; Glenn H. Lenzen, Jr.

[57] ABSTRACT

A holographic display including a planar transparent light pipe (11) configured for rotation about a light pipe rotation axis that is orthogonal to the planar extent of the transparent light pipe and passes through a rotational center of the light, a multiple image hologram structure (13) having a plurality of holographic images attached to one side of the planar transparent light pipe, wherein the images are at different azimuthal angular positions on the light pipe about the light pipe rotation center, and a light source (17) for illuminating an input surface of the transparent light pipe such that an injected beam propagates within the light pipe to provide reconstruction illumination for a portion of the multiple image hologram structure. The azimuthal angular position of the transparent light pipe about the light pipe rotation axis determines which portions of the plurality of holographic images are reconstructed, and a mask (19) is provided for masking the light diffracted by the multiple image hologram structure.

8 Claims, 3 Drawing Sheets

ROTATING KNOB, VARIABLE IMAGE HOLOGRAPHIC DISPLAY

BACKGROUND OF THE INVENTION

The disclosed invention relates generally to display systems, and more particularly to a rotatably variable image holographic display.

Current automotive radio console and instrument panel displays commonly include a mask having translucent symbols formed therein and incandescent bulbs located behind respective symbols. When a bulb is energized, a glowing symbol becomes visible against the dark background of the mask.

Known techniques for achieving a radio console and instrument panel display wherein the information content of the display changes, for example with the rotation of a control knob such as a radio volume knob, include the use of color absorptive variable color disks. However, color absorptive variable color disks are difficult and expensive to manufacture, produce displays that are relatively dim, and are limited in the nature of the changeable information content. Electronic displays can be utilized for providing changeable display content, but are complex and expensive.

SUMMARY OF THE INVENTION

It would therefore be an advantage to provide an improved radio console and instrument panel display that produces a dynamically changeable display output.

Another advantage would be to provide an improved radio console and instrument panel display that produces a display output that changes in response to a control input.

The foregoing and other advantages are provided by the invention

BRIEF DESCRIPTION OF THE DRAWINGS

The advantages and features of the disclosed invention will readily be appreciated by persons skilled in the art from the following detailed description when read in conjunction with the drawing wherein.

DETAILED DESCRIPTION OF THE DISCLOSURE

Figure 1:
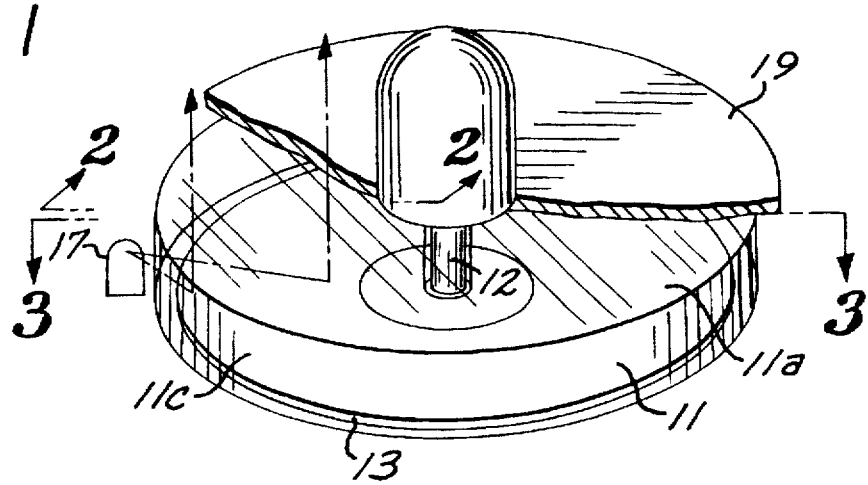
FIG. 1 is a perspective view of a variable image holographic display in accordance with the invention.

In the following detailed description and in the several figures of the drawing, like elements are identified with like reference numerals.

Figure 2:
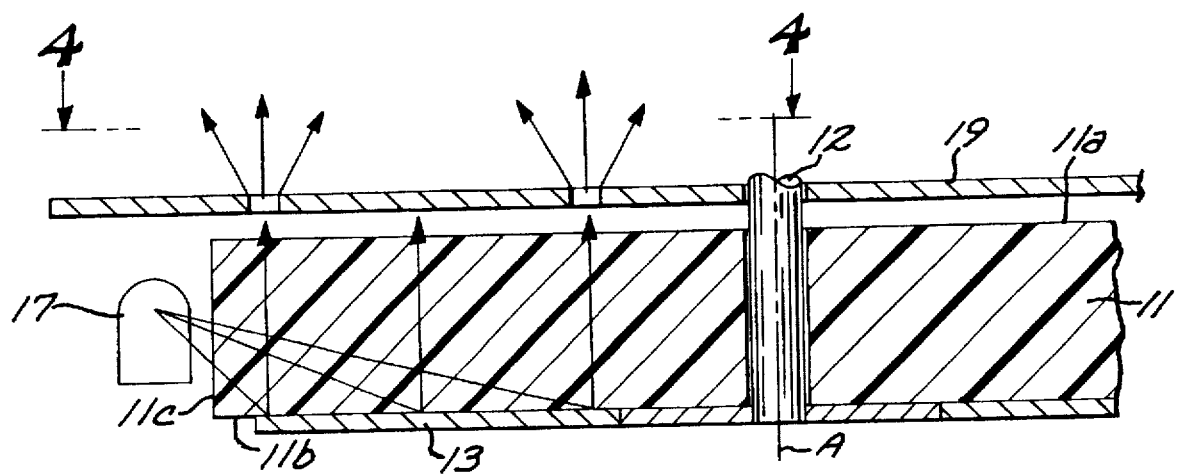
FIG. 2 is an elevational view of the variable image holographic display of FIG. 1.

Referring now to FIGS. 1 and 2, schematically set forth therein are a partially cut-away perspective view and a side elevational view of a changeable image holographic display in accordance with the invention which includes a planar circular light pipe 11 having a front surface 11a, a rear surface 11b, and an input surface 11c that is generally conically or cylindrically shaped. The light pipe 11 is attached to a rotatable shaft 12 for rotation about a light pipe rotation axis A that passes through the center of the circular light pipe and is orthogonal to the planar extent of the light pipe 11. For example, the rotatable shaft 12 comprises a control shaft for a radio.

A multiple image hologram structure 13 having a plurality of holographic images is attached to the rear side 11b of the planar transparent light pipe 11. The holographic images are at different azimuthal angular positions about the center of the light pipe 11, occupying for example wedge shaped hologram areas that together form an arc shaped region. The holographic images are recorded so as to be identically reconstructible by an injected beam provided by an incandescent bulb 17 located adjacent the input surface 11c of the planar light pipe 11. In other words, each of the holographic images is reconstructed by the injected beam when such hologram is illuminated by the injected beam at the proper angle. Effectively, each holographic image is recorded so as to be reconstructed when it is located between the incandescent bulb 17 and the light pipe axis of rotation A.

The incandescent bulb 17 is configured to direct a beam to the input surface 11c, at an angle such that the portion of the beam that is injected into the light pipe propagates toward the multiple image hologram structure 13. By way of illustrative example, the incandescent bulb 17 includes a suitable reflector for directing light to the input surface 11c.

Since each of the holographic images is recorded for identical reconstruction, and since the holographic images are angularly distributed about the light pipe rotation axis, only a portion of the holographic images is reconstructed at any given azimuthal angular position of the light pipe 11 about the rotation axis A, wherein such reconstructed portion is located between the incandescent bulb 17 and the light pipe rotation axis A. Thus, the reconstructed information changes as the azimuthal angular position of the light pipe 11 is changed, for example by rotation of the shaft 12.

A stationary mask 19 disposed in front of the front surface 11a of the light pipe 11 contains for example an aperture for masking light diffracted by the hologram structure 13 from light injected into the light pipe 11 by the incandescent bulb 17, and/or a translucent symbol that is illuminated by light diffracted by the hologram structure 13 from light injected into the light pipe 11 by the incandescent bulb 17.

Figure 3:
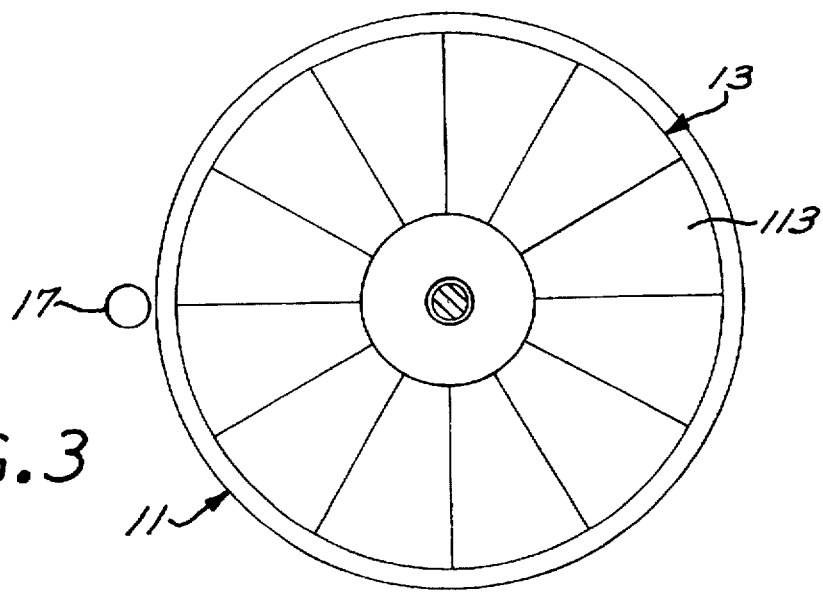
FIG. 3 is a front elevational view of the multiple image hologram of a specific implementation of a variable image holographic display in accordance with the invention.
Figure 4:
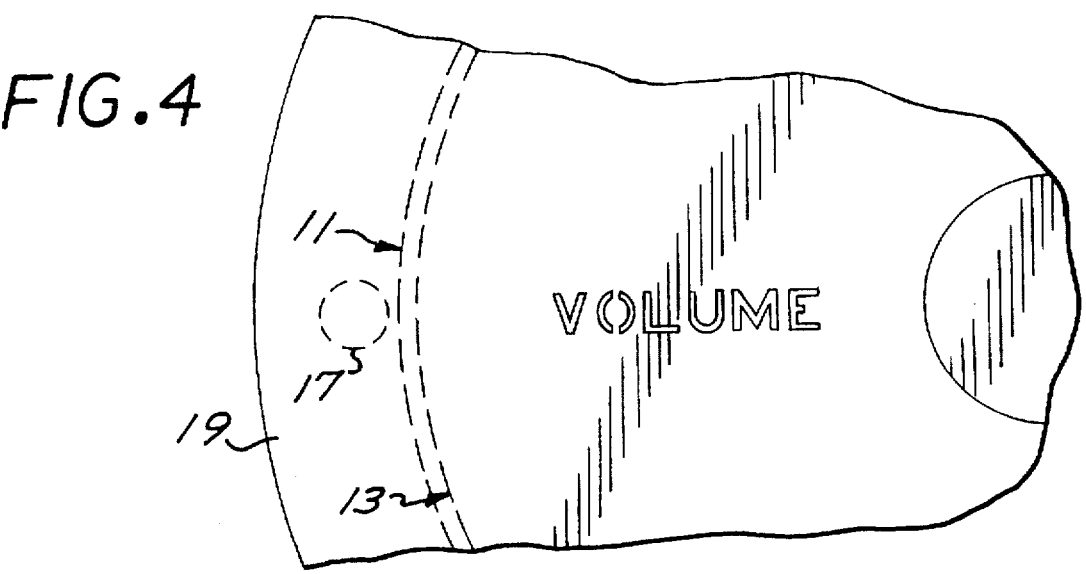
FIG. 4 is a front elevational view of the mask of the variable image holographic display of FIG. 3.

Referring now to FIGS. 3 and 4, schematically shown therein is an illustrative example of an implementation of the holographic display of the invention. The multiple image hologram 13 is comprised of a plurality of wedge shaped holograms 113 which vary in color across the spectrum from blue to red in the counterclockwise direction. The holograms 113 are oriented such that the blue hologram having the shortest wavelength is adjacent the incandescent bulb 17 when the shaft is in its farthest counterclockwise position, and such that the red hologram having the longest wavelength is adjacent the incandescent bulb 17 when the shaft is in its farthest clockwise position. The mask is comprised of transparent or translucent areas that form the word VOLUME. Thus, when the shaft is rotated in the clockwise direction, the displayed VOLUME changes in color towards the red portion of the spectrum. When the shaft is rotated in the counterclockwise direction, the displayed VOLUME changes in color towards the blue portion of the spectrum.

Figure 5:
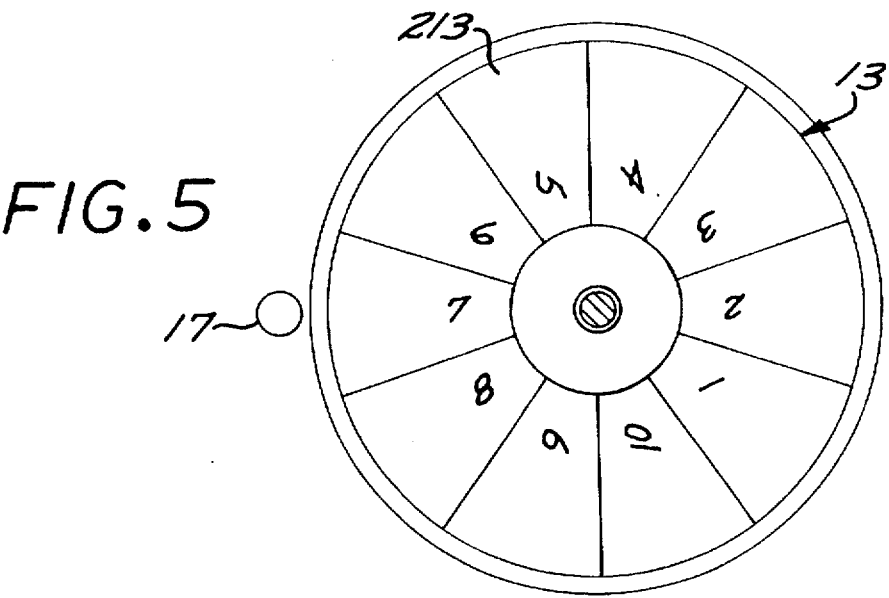
FIG. 5 is a front elevational view of the multiple image hologram of another implementation of a variable image holographic display in accordance with the invention.
Figure 6:
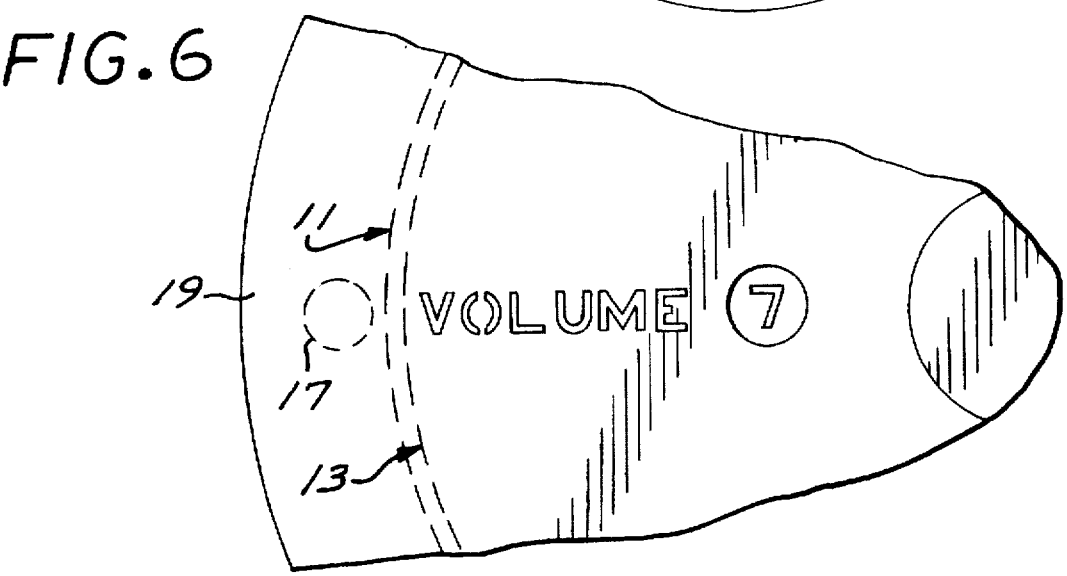
FIG. 6 is a front elevational view of the mask of the variable image holographic display of FIG. 5.

Referring now to FIGS. 5 and 6, schematically shown therein is an illustrative example of a further implementation of the holographic display of the invention. The multiple image hologram 13 is comprised of a plurality of wedge shaped holograms 213 that respectively contain the digits 1 through 10 which increase in the counterclockwise direction. Each of the holograms 213 is oriented so that the digit image of the hologram 213 located adjacent the incandescent bulb 17 is right side up. The holograms 213 are further oriented such that the 1 hologram is adjacent the incandescent bulb 17 when the shaft is in its farthest counterclockwise position, and such that the 10 hologram is adjacent the incandescent bulb 17 when the shaft is in its farthest clockwise position. The mask is comprised of an aperture that allows viewing of the digit of the reconstructed hologram, and transparent or translucent areas that form the word VOLUME. Thus, when the shaft is rotated, one digit disappears and the next digit appears, and the word VOLUME is visible as a result of light from the background of the displayed digit. To the extent that the backgrounds of the holograms 213 are of different colors similarly to the holograms 113 of the implementation of FIGS. 3 and 4, the displayed VOLUME changes in accordance with the background color of the displayed digit.

Alternatively, the word VOLUME is formed of translucent/reflective areas that are illuminated by a separate bulb when the vehicle lights are on, and by ambient light when the vehicle lights are off. In such implementation, the holograms 213 would be of lesser radial extent. As yet another alternative, the word VOLUME is formed of translucent/reflective areas that illuminated by a separate hologram, for example an arc shaped hologram that is radially outboard of holograms 213 that would of lesser radial extent.

Figure 7:
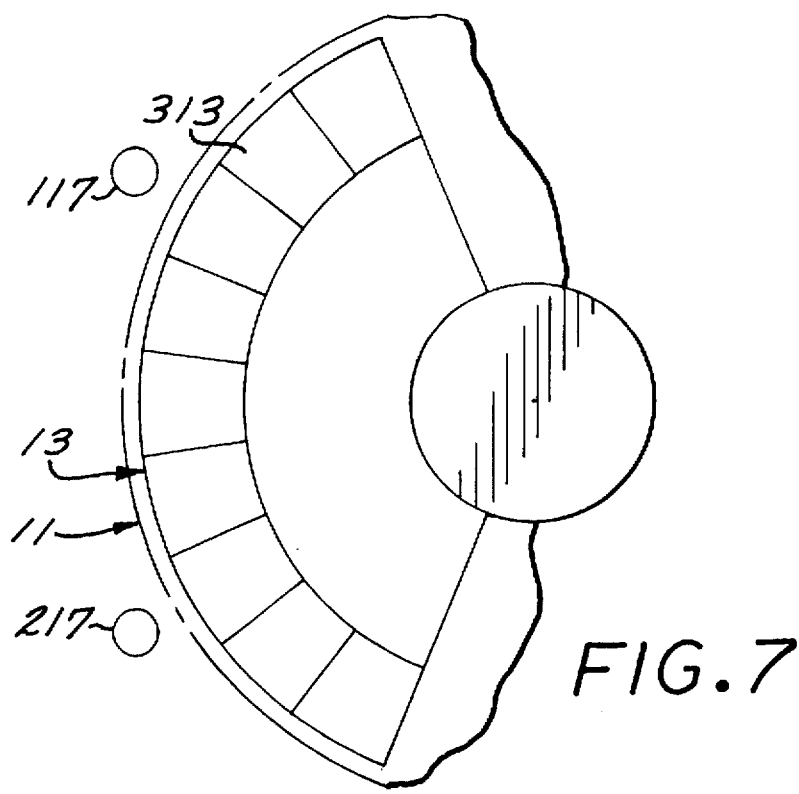
FIG. 7 is a front elevational view of the multiple image hologram of another implementation of a variable image holographic display in accordance with the invention.
Figure 8:
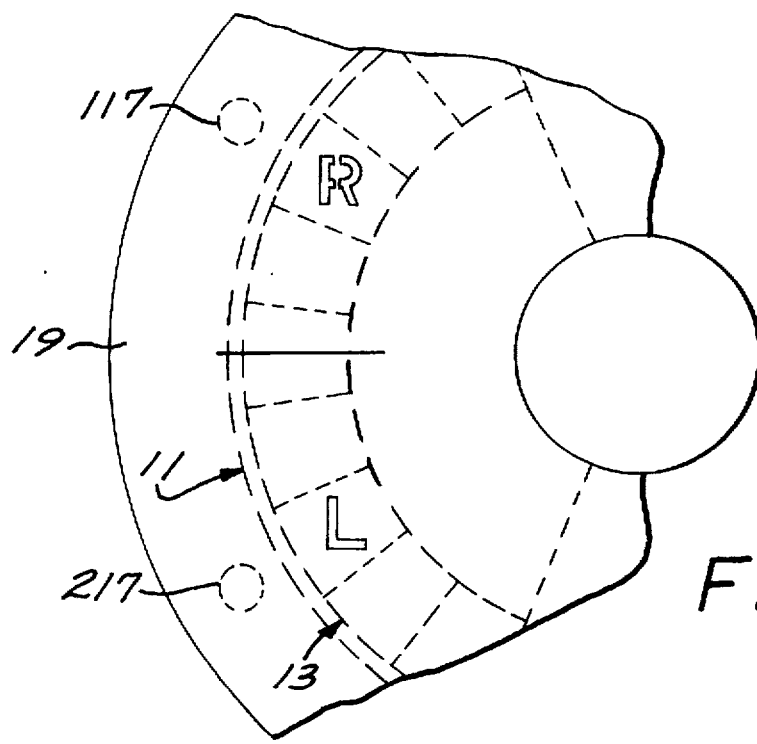
FIG. 8 is a front elevational view of the mask of the variable image holographic display of FIG. 7.

Referring now to FIGS. 7 and 8, schematically shown therein is an illustrative example of an implementation of the holographic display of the invention which displays the left/right stereo balance setting. The holographic display includes two incandescent bulbs 117 and 217 that inject light into the input surface 11c of the light pipe 11. The multiple image hologram 13 is comprised of a plurality of wedge shaped holograms 313 which vary in color across the visible spectrum from blue to red to blue. The mask is comprised of transparent or translucent areas adjacent the incandescent lamp 117 that form the letter R, and transparent or translucent areas adjacent the incandescent lamp 217 that form the letter L. The holograms 313 are oriented such that the farthest clockwise blue hologram is adjacent the incandescent bulb 117 and the red hologram of the longest wavelength is adjacent the incandescent bulb 217 when the shaft is in its farthest counterclockwise position, and such that the farthest counterclockwise blue hologram is adjacent the incandescent bulb 217 and the red hologram of the longest wavelength is adjacent the incandescent bulb 117 when the shaft is in its farthest clockwise position. When the shaft is centered in its angular range, holograms in about the center of the spectrum, for example green, are respectively adjacent the incandescent bulbs 117, 217.

The foregoing has thus been a disclosure of an inexpensive variable image holographic display that provides a display output having changeable information content, and which is brighter and more saturated in color. The disclosed variable image holographic display advantageously avoids the use of absorptive variable color disks and complex electronic components.

Although the foregoing has been a description and illustration of specific embodiments of the invention, various modifications and changes thereto can be made by persons skilled in the art without departing from the scope and spirit of the invention as defined by the following claims.

What is claimed is:

1. A holographic display comprising:

a planar transparent light pipe configured for rotation about a light pipe rotation axis that is orthogonal to the planar extent of said transparent light pipe and passes through a rotational center of said transparent light pipe;

a multiple image hologram structure having a plurality of holographic images attached to one side of said planar transparent light pipe, said holographic images being at different azimuthal angular positions on the light pipe about said rotational center;

a light source for illuminating an input surface of said transparent light pipe, such that an injected beam propagates within said light pipe to provide reconstruction illumination for a portion of said multiple image hologram structure; and a rotatable shaft for rotating said transparent light pipe about said light pipe rotational axis;

whereby the azimuthal angular position of said transparent light pipe about said light pipe rotational axis determines which portions of said plurality of holographic images are reconstructed.

2. The holographic display of claim 1 further including a mask for masking light diffracted by said multiple image hologram structure.

3. The holographic display of claim 1 wherein said multiple image hologram comprises a plurality of holograms of different colors.

4. The holographic display of claim 1 wherein said multiple image hologram comprises a plurality of wedge shaped holograms arranged in an arc.

5. The holographic display of claim 1 wherein said rotatable shaft is located at said rotational center of said transparent light pipe.

6. The holographic display of claim 1 including a second light source for illuminating said input surface of said transparent light pipe, such that a second injected beam propagates within said light pipe to provide second reconstruction illumination for a second portion of said multiple image hologram structure.

7. The holographic display of claim 6 wherein said multiple image hologram comprises a plurality of holograms of different colors.

8. The holographic display of claim 6 wherein said plurality of holograms of different colors are arranged in an arc wherein a hologram at the center of the arc is of a first color and holograms at ends of the arc are of a second color.

* * * * *